United States Patent [19]

Fauquet et al.

[11] Patent Number: 4,823,188

[45] Date of Patent: Apr. 18, 1989

[54] APPARATUS FOR CORRECTING FOR SHADING DEFECTS IN VIDEO SIGNALS INDUCED BY VARIATIONS IN THE SPEED OF SCANNING SPOTS IN A TV CAMERA

[75] Inventors: Jean Noel Fauquet, Saint Leu La Foret; Gérard Desmons, Clichy, both of France

[73] Assignee: Thomson Video Equipement, Gennevilliers, France

[21] Appl. No.: 771,771

[22] Filed: Sep. 3, 1985

[30] Foreign Application Priority Data

Sep. 7, 1984 [FR] France .................................. 84 13812

[51] Int. Cl.⁴ ..................... H04N 9/093; H04N 5/228; H01J 29/72
[52] U.S. Cl. ..................................... 358/51; 358/163; 358/217; 315/371
[58] Field of Search ..................... 358/50, 51, 217, 10, 358/29; 315/370, 371

[56] References Cited

U.S. PATENT DOCUMENTS

| | | | |
|---|---|---|---|
| 4,285,004 | 8/1981 | Morrison et al. | 358/10 |
| 4,326,219 | 4/1982 | Griesshaber | 358/10 |
| 4,437,110 | 3/1984 | Hunaut et al. | 358/163 |
| 4,485,394 | 11/1984 | Ghaem-Maghami et al. | 358/10 |
| 4,499,488 | 2/1985 | White et al. | 358/51 |
| 4,500,916 | 2/1985 | Nabulsi | 358/51 |
| 4,549,117 | 10/1985 | Takahashi et al. | 358/51 |
| 4,647,822 | 3/1987 | Masuda et al. | 315/371 |
| 4,649,421 | 3/1987 | Kodama et al. | 358/51 |

FOREIGN PATENT DOCUMENTS

| | | |
|---|---|---|
| 2372556 | 6/1978 | France . |
| 2501949 | 9/1982 | France . |
| 2147171 | 5/1985 | United Kingdom ................. 358/51 |

*Primary Examiner*—James J. Groody
*Assistant Examiner*—Randall S. Svihla
*Attorney, Agent, or Firm*—Cushman, Darby & Cushman

[57] ABSTRACT

A device for correcting shading in video signals which has conventionally occurred due to variations in speeds of the scanning spots. Speeds of the scanning spot are detected, and variations in these speeds are also detected. In addition, conventional-type digital correction values for correcting geometry and convergence errors are produced. Variations in speed are detected, and are digital-to-analog converted. A shading output correction signal indicative of a sweep speed variation is produced. This signal is added to the digital correction values to form a corrected correction value.

3 Claims, 2 Drawing Sheets

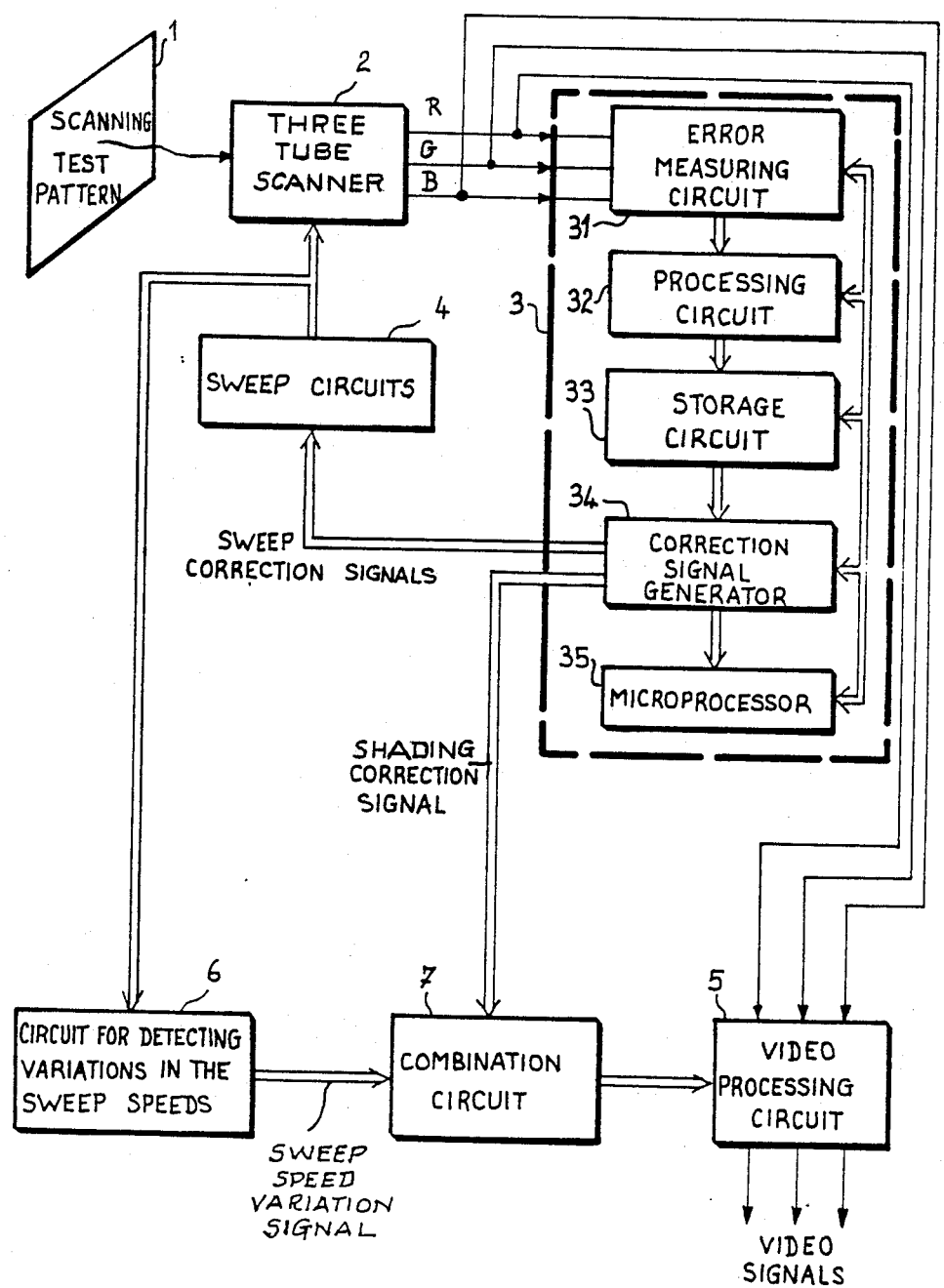
FIG_1

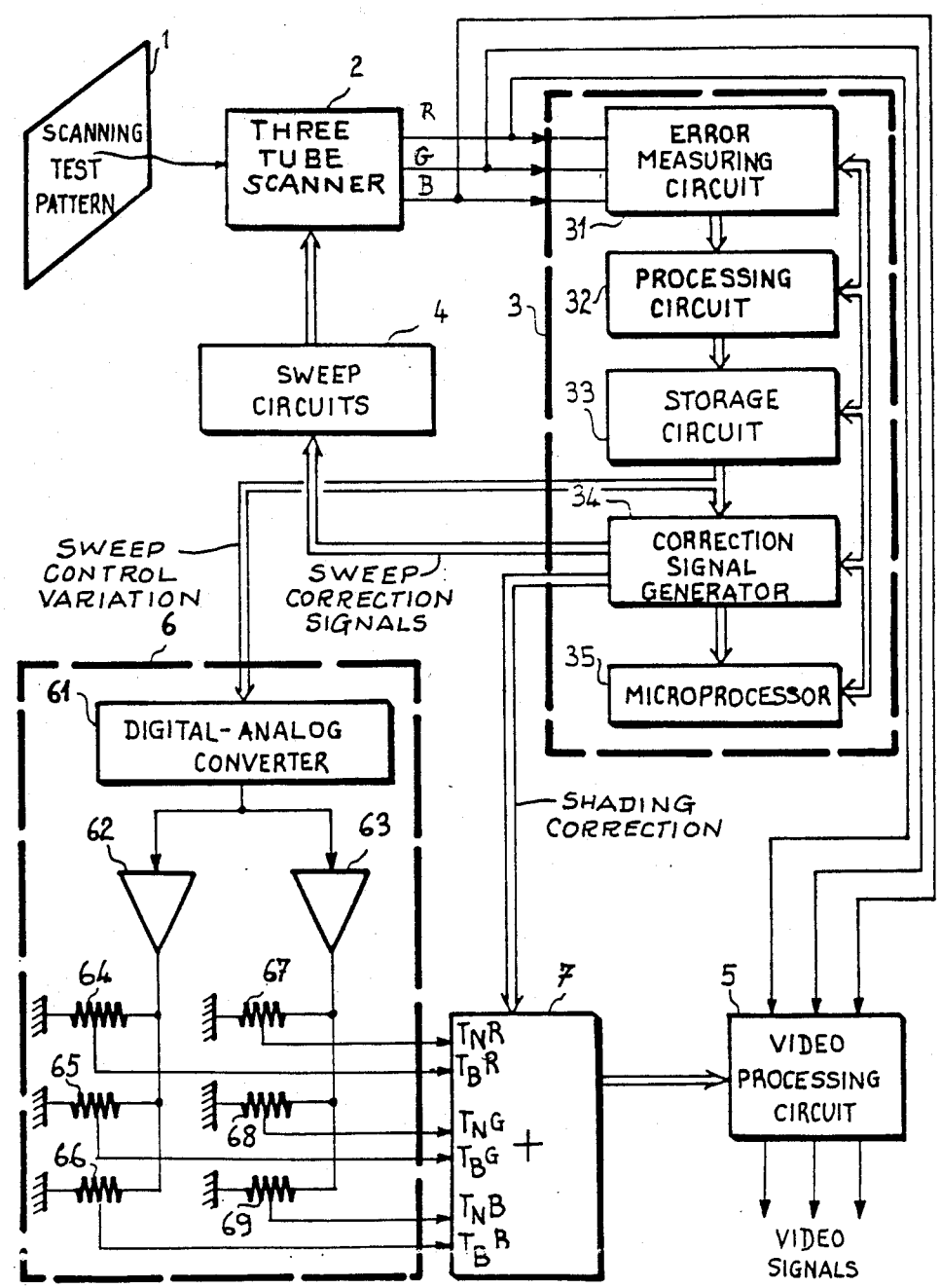
FIG_2

APPARATUS FOR CORRECTING FOR SHADING DEFECTS IN VIDEO SIGNALS INDUCED BY VARIATIONS IN THE SPEED OF SCANNING SPOTS IN A TV CAMERA

BACKGROUND AND SUMMARY OF THE INVENTION

The present invention relates to television cameras. More particularly, the present invention relates to the correction of uniformity variations or shading, particularly of black and white signals, resulting from variations of the spot speed, the geometry and convergence of the three primary color images of a video camera.

A three-tube colour camera subdivides the light received during shooting using an optical system, to form three so-called primary images on the targets of three red, green and blue tubes. These images are then detected. A difficulty encountered in this system is the centering of these images and the superimposing of the three scans, centering and superposing is necessary to cause passage of spots at the same instant onto the three imges of the same point of the object. The fine adjustments of these images areas and the geometry distortions of the scans and the objects may be adequate at times, but the precision required is such that the geometry adjustments are not maintained over a period of time. Adjustment systems exist for restoring the superimposed position (convergence) by modifying the scans or sweeps of the tubes with respect to one another, so that the resulting signals can, by superimposing, restore a good quality image. Generally the geometry correction is calculated for the green channel by comparison with an electronic test pattern, and is applied to the three channels of red, green and blue. Supplementary convergence corrections are then calculated relative to the green channel taken as a reference and are applied to the red and blue channels.

At present, automatic adjustment systems exist which are controlled by microprocessors and modify the line and frame sweep speeds of each of the three tubes as a function of the calculated corrections. In one of these known systems, correction signals are established after a measuring cycle and are superimposed on the horizontal and vertical sawtooth sweep signals of the pickup tubes. These correction signals accelerate or decelerate the speed of the scanning or sweep spot and thus obtain appropriate centering and superimposing of the three colours. The correction signals are typically filtered in an analog or digital manner, or smoothed by calculations. However, these correction signals still induce discontinuities in the sweep sawtooth. These discontinuities lead to spots or stains in the resulting image, which can be intensified by subsequent video processing of the grey expansion type, automatic servocontrol of the black level, intensifying of the contours, etc.

Independently of the uniformity defects induced in the signal from a television camera by spot speed variations, there are other uniformity defects, whereas the scanning of an image of uniform luminance and hue should give primary signals with constant values. In practice, such constant values are not obtained for various reasons linked with faults in the optics, e.g. nonuniform sensitivity of the scanners, to stray light, etc. A correction of such faults or defects, called spots or stains, is conventionally accomplished by adding to the video signals correction signals produced at the line frequency and at the frame frequency for the correction of black spots and by multiplying the video signals by correction signals for the correction of white spots. These correction signals can be regulated manually or automatically on the basis of a test pattern, or by a combination of both of these. This so-called stain or spot correction is carried out directly on the signals from the pickup tubes and consequently make it possible to maintain high (white) and low (black) levels of the video signal at constant values for each of the three tubes.

However, as stated hereinbefore, apart from these spots or stains which are corrected in a conventional manner, the spots or stains linked with speed variations of the sweep spot produced as a result of the automatic correction of the convergence and geometry by an automatic correction system are added thereto. These latter stains are much more clearly defined than the first mentioned stains. This phenomenon is particularly sensitive in the vertical direction of the image. Thus, in the horizontal direction, the sweep correction is carried out with a timing greatly exceeding the horizontal sweep frequency, so that the correction signals are smoothed in horizontal deflection coils. This smoothing is much less pronounced in the vertical direction, because the speed variations in question produce interlining variations of the frame. These defects have always existed, but the use of automatic means and digital geometry corrections have led to spots, whose geometrical shape, linked with the manner of measuring the errors and correcting them, is visually unfavourable. Thus, the correction signals resulting from the scan lead to variations in steps, which can be large. Smoothing has made it possible to reduce these variations, but the increases are visible on the image, particularly in the transitions between the elementary scan patterns in the uniform zones. Thus, if at a given instant the speed of the spot is increased compared with the preceding instant and the quantity of electrons to be discharged on the target is the same (hue and luminance are equal to those of the preceding instant), the resulting scan signal increases, which leads to overbrightness in the restored image. Conversely when the speed of the spot decreases, the scanned video signal decreases.

In order to solve this problem, the apparatus according to the invention detects the variations in the sweep speed of at least one scanning spot, e.g. that of the green channel, because the variations in the two other channels are the same, except for the differential convergence corrections. These variations correspond to the derivative of the sweep signal of the scan spot. This signal is identical in phase and in shape to the defects noted on the tubes. This signal is then added, with an appropriate gain and sign, to the correction signals of the black and white spots of the three channels or directly to the corrected video signals.

The present invention further defines an apparatus which corrects for shading induced in video signals from a television camera when the shading is caused by the variations in speeds of scanning spots. An automatic correction circuit includes a microprocessor and a correction storage device which stores values used for correcting geometry and convergence errors. The values are updated during measurement cycles and are read under normal operations. These increases are also used for correcting for the shading. A digital to analog converter and an integrator amplifier, as well as a combination circuit, correct these values as well as receiving video signals from the pickup tubes.

BRIEF DESCRIPTION OF THE DRAWINGS

An exemplary and presently preferred embodiment of the invention will be described in detail with reference to the accompanying drawings, wherein:

FIG. 1 shows a block diagram of a first embodiment of the correction apparatus according to the present invention; and FIG. 2 shows a block diagram of a second embodiment of this correction apparatus.

DETAILED DESCRIPTION OF THE PREFERRED EMBODIMENTS

FIG. 1 is a block diagram of the apparatus according to the invention. A scanning test pattern 1 is associated with scanner 2, which is e.g. a three-tube scanner as indicated hereinbefore, supplying three red, green and blue video signals. These three signals are applied to an automatic regulating circuit 3, which has error measuring circuit 31 for measuring errors in order to detect geometry and convergence defects. The variations detected during a measuring cycle are processed in a processing circuit 32, which establishes the necessary digital correction values to correct errors detected by measuring circuit 31. These correction values are stored in a storage circuit 33. A correction signal generator 34 supplies, on the basis of the digital correction values, the signals necessary for controlling the horizontal and vertical sweep circuits of the three red, green and blue tubes. A microprocessor 35 controls the circuits 31, 32, 33, 34.

In a system where spot correction is also carried out by the automatic correction circuit, the correction signal generator 34 also supplies signals for correcting the black and white spots for the three tubes. The sweep correction signals are applied to the control input of sweep circuit 4 and the spot correction signals are applied to the video processing circuit 5, which also receives the video signals from the tubes. The sweep circuit controls the tubes of scanner 2 and the video processing circuit 5 supplies the video signals from the camera. The hitherto described circuits are of a conventional nature. The circuit according to the invention also has a circuit 6 for detecting variations in the sweep speeds of sweep signals from sweep circuit 4. Signals characteristic of the sweep speed variations are produced by circuit 6 and are applied to the input of a combination circuit 7 located between the spot correction signal outputs (also called a shading correction signal) of generator 34 and the spot correction inputs of the video processing circuit 5. Thus, the characteristic signals of the sweep speed variations called shading correction signals are combined with the conventional spot correction signals.

The circuit 6 for detecting the sweep speed variations can be realised in various different ways. It can be a circuit for differentiating the sweep signal, or a circuit for the line-by-line correlation of the sweep signal, particularly for detecting sweep speed variations in a vertical direction, but any other appropriate construction can also be used.

In the special embodiment of the convergence and geometry correction circuit described in the prior art, the processing circuit 32 associated with microprocessor 35 is coupled to receive outputs such that it can calculates increases in the sweep control voltage. Such increases are applied directly, following digital-analog conversion, to the sweep circuit 4. These increases in the sweep control voltage cause changes in the slopes of the sweep sawteeth and also may lead to spots or stains on the images.

In a special embodiment of the invention described with reference to FIG. 2, these increases are directly extracted at the output of storage circuit 33 and are applied after digital-analog conversion and without any other processing, except for a possible amplitude adjustment, to the output video processing circuit 5 which receives the video signals.

FIG. 2 shows a diagram of this second embodiment of the apparatus according to the invention, where the same elements as in FIG. 1 are designated by the same references. The circuit 6 for detecting sweep speed variations has an input connected to the output of storage circuit 33. This input, indicative of the increase in sweep control voltage, is connected to the input of a digital-converter 61, with an associated clock signal. The analog signal output of said converter is respectively connected to the inputs of two operational amplifiers 62, 63. These amplifiers are connected so as to directly supply output signals having appropriate gains and signs, which are a function of the further processing in the video processing circuit 5. The output signal of amplifier 62 is applied to three potentiometers 64, 65, 66, whereof the settings are a function of the respective levels of the three video signals for the correction of black spots in the three channels R (red), G (green) and B (blue): $T_BR$, $T_BG$, $T_BB$. In the same way, the output signal of amplifier 63 is applied to three potentiometers 67, 68, 69, whose settings are also a function of the respective levels of the three video signals for correcting white spots in the three channels R, G, and B: $T_WR$, $T_WG$, $T_WB$.

Combination circuit 7 then solely comprises adders for adding the conventional black and white spot correction signals of the three channels from the correction signal generator 34 to the thus obtained supplementary correction signals.

In practice, the faults found are mainly linked with vertical sweep speed discontinuities induced by the geometry correction common to the three channels, so that a correction based on vertical sweep voltage increases simultaneously applied to the three channels may be adequate.

However, the invention is not limited to these special embodiments. In particular, if the supplementary differential corrections made to the vertical sweep speed for red and blue tubes for convergence correction purposes also induce significant defects, these supplementary variations can also be detected and added to the already processed spot correction signals for the red and green channels.

In the same way, it was stated hereinbefore that the spots on the screen can be produced by vertical sweep speed variations. However, although the horizontal sweep speed variations produce spots which are visible on the image, the same correction can be carried out by detecting horizontal sweep speed variations in one channel, or in the three channels and addition of the detected signals, with an appropriate gain and sign, to the black and white spot correction signals. These supplementary correction signals need to be at frequencies which are submultiples of the line frequency.

Finally, it has been assumed in the above description that the scanner was a three-tube scanner, each of these tubes being controlled by a horizontal sweep signal and a vertical sweep signal. However, this description is not limitative and the invention is also applicable to a camera in which the trichromatic scanner only has a single tube. In this case there is obviously no horizontal sweep and vertical sweep and the detection of the scan variations takes place for said single tube, because there is only a centering (or geometry) problem and not a convergence problem.

What is claimed is:

1. An apparatus for correcting for shading induced in video signals from a television camera by variations in the speed of scanning spots in pickup tubes of said television camera, said scanning spot speed variations being produced for correction of geometry and convergence errors in said pickup tubes, said apparatus comprising:

means for producing digital correction values for correcting said geometry and convergence errors, including a microprocessor;

storage means, connected to said producing means, for storing said digital correction values;

means for producing black and white spot correction signals based on said digital correction values;

means for detecting variations in the speed of a scanning spot in at least one of said pickup tubes in at least one scanning direction, comprising:

(a) digital-to-analog converting means, coupled to receive stored digital correction values from said storage means;

(b) amplifier means, coupled to said digital-to-analog converting means, for producing shading correction signals; and means for combining said shading correction signals and said black and white spot correction signals with said video signals to produce corrected video signals.

2. An apparatus as in claim 1 wherein said amplifier means includes means for adjusting the DC levels of said shading correction signals.

3. An apparatus as in claim 2 wherein said amplifier means comprises a plurality of output potentiometers for deriving a black and a white shading correction signal for each of said pickup tubes.

* * * * *